United States Patent [19]
Yamada

[11] 4,206,606
[45] Jun. 10, 1980

[54] EXHAUST GAS RECIRCULATION MECHANISM FOR AN ENGINE WITH A TURBOCHARGER

[75] Inventor: Koichiro Yamada, Ibaraki, Japan

[73] Assignee: Hitachi, Ltd., Tokyo, Japan

[21] Appl. No.: 920,697

[22] Filed: Jun. 30, 1978

[30] Foreign Application Priority Data

Jul. 1, 1977 [JP] Japan .................................. 52/79373

[51] Int. Cl.² ........................................... F02B 37/00
[52] U.S. Cl. ....................................... 60/605; 60/611; 123/119 A
[58] Field of Search ......................... 60/605, 611, 599; 123/119 A

[56] References Cited

U.S. PATENT DOCUMENTS

| 3,925,989 | 12/1975 | Pustelnik | 60/605 X |
| 4,078,387 | 3/1978 | Melchior et al. | 60/611 X |

FOREIGN PATENT DOCUMENTS 941532 11/1963 United Kingdom ...................... 60/605

*Primary Examiner*—Michael Koczo
*Attorney, Agent, or Firm*—Craig & Antonelli

[57] ABSTRACT

A recirculation duct with a check valve is connected to an exhaust duct communicating with the engine and a turbine of a turbocharger and an delivery duct communicating with the engine and compressor of the turbocharger. A branch duct is connected to the delivery tube upstream of the recirculation duct. In the branch duct, a control valve is provided for controlling a quantity of air flowing in the branch duct according to both a pressure in the exhaust duct and a pressure in the delivery duct downstream of the branch dust to lower the pressure in the delivery duct downstream of the branch duct thereby recirculating part of the exhaust gas. The control valve is provided with a dashpot and push rods, and driven by an accelerator when the engine runs at high load. The dashpot damper a rapid movement of the control valve made by the accelerator.

6 Claims, 8 Drawing Figures

EXHAUST GAS RECIRCULATION MECHANISM FOR AN ENGINE WITH A TURBOCHARGER

BACKGROUND OF THE INVENTION

This invention relates an exhaust gas recirculation mechanism for an engine with a turbocharger.

In an engine with a turbocharger, it has been impossible to recirculate part of the exhaust gas into the engine to decrease the NOx in the exhaust gas without passing it through a compressor of the turbocharger since the exhaust pressure of the engine is lower than the suction pressure of the engine. It is known, however, to recirculate the exhaust gas by introducing part of the exhaust gas into an inlet of the compressor, and to recirculate by introducing the exhaust gas into a suction pipe of the engine using a pump for pressurizing the exhaust gas. The latter case is shown by Automobile Technology Vol. 26, No. 2, 1972 "Recent Survey on Controlling Exhaust Emission and Noise from Diesel Engines" P. 137.

In the exhaust gas, black smoke and corrosive gas are included, and, particularly in the diesel engine, a large quantity of black smoke and corrosive gas are exhausted. Therefore, when these gases are introduced into the pump or compressor, the black smoke or carbon and the corrosive gas adhere to the blades and rotating portions of the pump or the compressor so that its long life time can not be expected.

Further, in a diesel engine with a conventional exhaust gas recirculation mechanism, every time the accelerator is stepped on abruptly a large amount of NOx is discharged for a moment so that the total amount of NOx discharged during running of the engine may be large and can not be disregarded.

SUMMARY OF THE INVENTION

It is an object of the invention to provide an exhaust gas recirculation mechanism for an engine with a turbocharger, in which a part of the exhaust gas from the engine can be recirculated without passing through a compressor of the turbocharger.

It is another object of the invention to provide an exhaust gas recirculation mechanism for an engine with a turbocharger, in which a part of the exhaust gas is recirculated without introducing it into a compressor so that the NOx in the exhaust gas can be minimized without lowering the engine performance.

It is further another object of the invention to provide an exhaust gas recirculation mechanism for an engine with a turbocharger, in which a recirculation rate can change according to the running conditions without abruptly changing the recirculation rate.

Briefly stated, a feature of the invention is that a part of the exhaust gas from an engine with a turbocharger is recirculated by discharging part of the air in an air passage, provided between the engine and the turbocharger for lowering the pressure in the air passage, and by introducing part of the exhaust gas into the pressure lowered portion of the air passage.

DESCRIPTION OF THE PREFERRED EMBODIMENTS

As an embodiment of the invention, an exhaust gas recirculation mechanism for a diesel engine with a turbocharger will be described hereinafter.

Figure 1:
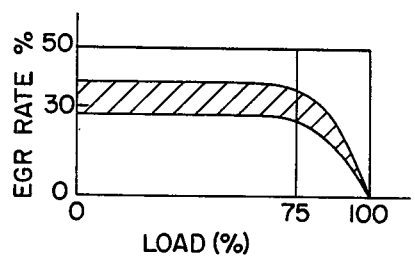
FIG. 1 is a graph showing a preferable relation of exhaust gas recirculation rate to time.

Referring to FIG. 1, there is shown a graph of a relation of exhaust gas recirculation rate (hereinafter simply called (EGR rate) to output (%) of the engine. A range, shown by inclined lines, is preferable for minimizing the NOx in the exhaust gas of the engine without lowering the engine performance Namely, in the range, the EGR rate of 30~40% is kept within about 75% of the engine output, and the exhaust gas is not recirculated at about 100% of the engine output.

Figure 2:
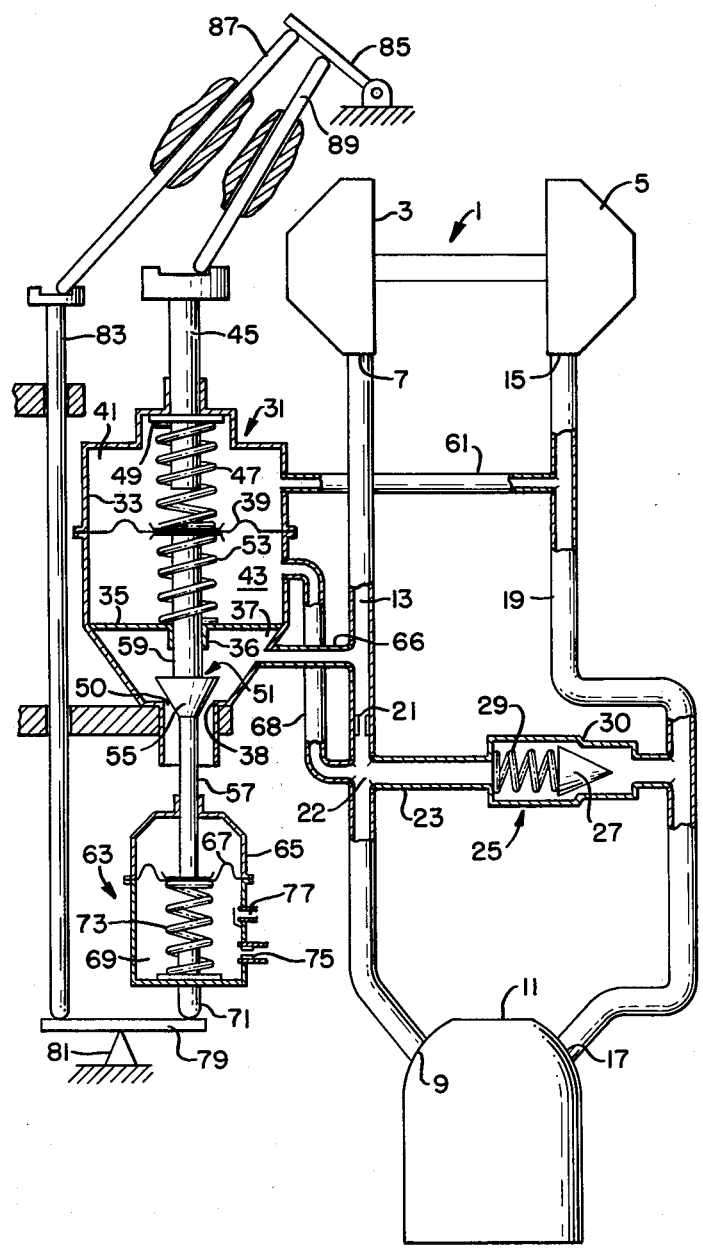
FIG. 2 is a partially sectional schematic diagram of an embodiment of an exhaust gas recirculation mechanism for an engine with a turbocharger according to the invention.

Referring to FIG. 2, there is shown the exhaust gas recirculation mechanism (hereinafter called simply EGR mechanism) for a diesel engine.

In FIG. 2, a turbocharger 1 is provided with a compressor 3 and a turbine 5. An outlet 7 of the compressor 3 is connected to an inlet port 9 of the diesel engine 11 through a delivery duct 13 so as to supply compressed air into the engine 11. An inlet 15 of the turbine 5 is connected to the exhaust port 17 of the engine through an exhaust duct 19 to drive the turbine 5 and exhaust therethrough. In the delivery duct 13, a throttle 21 is secured. The delivery duct 13 is fluidly connected to the exhaust duct 19 through a recirculation duct 23 with a check valve 25. The joining portion of the delivery duct 13 and the recirculation duct 23 is downstream of the throttle 21. The check valve 25 includes a conical valve body 27 and a spring 29 which presses the valve body 27 to a valve seat 30, and only permits the introduction of the exhaust gas from the exhaust duct 19 into the delivery duct 13 when a pressure in the delivery duct 13 exceeds a pressure in the exhaust duct 19.

A control valve 31, fixed to a stationary member, comprises a cylindrical casing 33, a partition 35, disposed in and secured to the casing 33 to define a valve box 37, a diaphragm 39, secured to the casing 33 to define an exhaust gas chamber 41 and a compressed air chamber 43, a rod 45, one end of which is disposed in the exhaust gas chamber 41 and the other end is disposed out of the chamber 41, a spring 47, inserted compressed between the diaphragm 39 and a flange 49 provided on the rod 45, a needle valve 51, and a spring 53. The needle valve 51 has a needle valve body 55, a needle rod portion 57 and a stem portion 59. The stem portion 59 is projected into the compressed air chamber 43 through a bearing portion 36 provided in the partition 35, and secured to the diaphragm 39. The needle valve body 55 faces a valve seat 38 of the valve box 37 so as to provide an air passage or gap 50 therebetween. The spring 53 is disposed, compressed between the partition 35 and the diaphragm 39, in the compressed air chamber 43. The exhaust gas chamber 41 communicates with the exhaust duct 19 through a branch duct 61 which is connected to the chamber 41 and the exhaust duct 19 downstream of the recirculation duct joining portion. The compressed air chamber 43 communicates with the delivery duct 13 downstream of the throttle 21 through a branch duct 68. The valve box 37 communicates with the compressed air duct 13 upstream of the throttle 21 through a branch duct 66.

On the end of the needle rod portion 57, a dashpot 63 is mounted. The dashpot 63 comprises a casing 65, a diaphragm 67 secured to the casing 65 and defining an air chamber 69, a pin 71 with a flange secured to the casing 65, one end of which is disposed in the air chamber 69 with the flange, the other end is projected out of the air chamber 69, and a spring 73 disposed compressed between the diaphragm 67 and the flange of the pin 71. The central portion of the diaphragm 67 is secured to the needle rod portion 57. The wall of the air chamber 69 is provided with an orifice 75 and a valve 77 with a reed that is a check valve. The pin 71 is disposed on one end of a lever 79 supported by a frucrum 81. The other end of the lever 79 is supporting a push rod 83. The push rod 83 and the rod 45 are engaged with the accelarator 85 through push rods 87 and 89 respectively when the accelarator 85 is stepped on to such an extent as described hereinafter.

Until the accelerator 85 is stepped on to such an extent that the engine output will become 75%, the push rods 89, 87 are free from contacting with the accelerator 85. In such a case, in the control valve 31, the air passage is provided between the needle valve body 55 and the valve seat 38. The section area of the air passage 50 is determined by the strength of the springs 47 and 53 and the pressures in both the exhaust duct 19 and in the delivery duct 13 which are applied on the diaphragm 39, and therefore positions the needle valve 51 relative to the valve seat 38. And the amount of the compressed air discharged through the section area of the air passage is determined so that a rate of the recirculation of the exhaust gas from the engine 11 to the delivery duct 13 through the recirculation duct 23 will be 30~40%.

When the control valve 31 is not restricted by the movement of the accelerator 85, the control valve 31 controls the quantity of air discharged through the branch duct 66 and the air passage 50 according to both the pressure in the exhaust duct 19 and the pressure in the delivery duct 13. When the pressure in the intake 9 of the engine 11 becomes higher than in the exhaust port 17 of the engine 11, the pressure in the compressed air chamber 43 becomes higher than in the exhaust gas chamber 41, so that the needle valve 51 is moved upward by the upward movement of the diaphragm 39 to make the gap 50 between the needle valve body 55 and the valve seat 38 larger thereby discharging the compressed air to a greater extent. As a result, the pressure downstream of the throttle 21 is lowered, and the valve body 27 of the check valve 25 is moved against the compression spring 29, so that part of the exhaust gas is recirculated into the intake port 9 through the recirculation duct 23 and the delivery duct 13.

Even if the exhaust gas pressure of the engine 11 changes according to the engine output or load changing, and the pressure at the outlet of the compressor 3 changes according to the exhaust gas pressure change, the control valve 31 changes the gap 50 according to the changing pressure difference between in the delivery duct 13 and the exhaust duct 19, with the needle valve moving upward and downward, the exhaust gas is recirculated at an aproximately constant EGR rate, that is, until the engine load or output reaches 75% the engine 11 is operated with 30~40% of the EGR rate being kept.

When the accelerator 85 is stepped on to run at 100% of the engine output, the push rods 89, 87 are pushed down. The downward movement of the push rod 89 instigates the downward movement of the needle valve 51 through the rod 45, the spring 47 and the diaphragm 39 so that the discharge passage 50 is closed with the needle valve body 55 contacting with the valve seat 38. Then, compressed air from the compressor 3 is introduced into the engine 11 so that the engine 11 can run at full load. On the other hand, the downward movement of the push rod 87 makes an upward movement of the dashpot 63 through the push rod 83 and the lever 79. Since the needle valve 51 is connected to the diaphragm 67, the upward movement of the dashpot 63 makes an upward movement of the needle valve 51 through the spring 73 and air in the air chamber 69 until the air in the air chamber 69 is discharged to some extent. The needle valve 51 moves down to close the discharge passage 50 as the air is discharged through the oriffice 75. Therefore, even if the accelerator is abruptly stepped on to the full extent, air to the engine 11 increases without a abrupt increase accordingly, the EGR rate changes smoothly, which is due to a damping effect of the dashpot 63.

Figure 3:
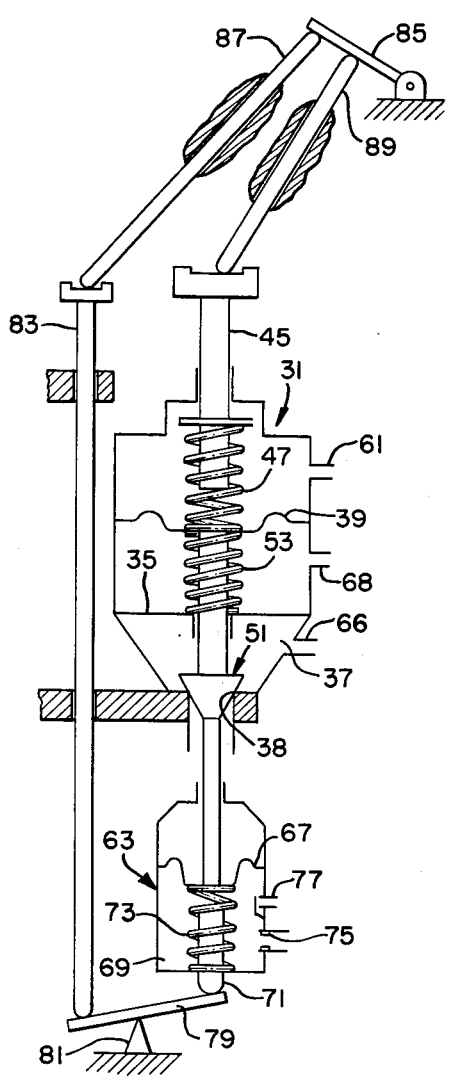
FIG. 3 and FIG. 4 are schematic diagrams each showing a condition of the embodiment in FIG. 2.
Figure 4:
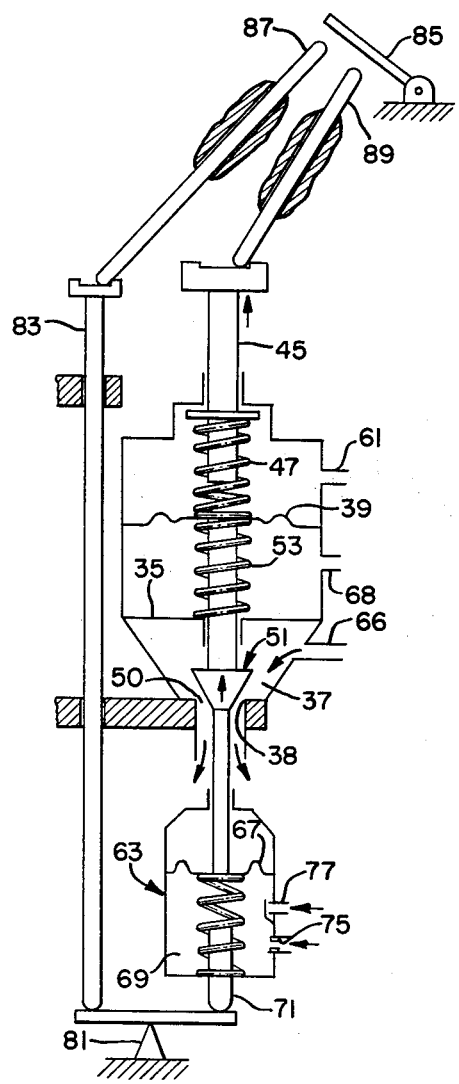

FIG. 3 shows a condition of the exhaust gas recirculation mechanism of FIG. 2, in which the accelerator 85 is fully stepped on, and FIG. 4 shows a condition of the exhaust gas recirculation mechanism of FIG. 2, when the engine 11 is returned from the condition that the accelerator 85 is fully stepped on to the condition that the normal operation effected, that is the engine 11 runs within 75% of the engine output. In latter case, the dashpot 63 is moved down by the spring 73 as the check valve 77 is opened. At the same time, the needle valve 51 is moved upwards by the spring 73 and stops at a position determined according to the pressures applied on both faces of the diaphragm 39 so that part of the exhaust gas from the engine 11 is recirculated to the engine 11 through the exhaust duct 19 and the recirculation duct 23 and delivery duct 13.

In case of the intermediate condition that the accelerator 85 is stepped on to the extent that the engine 11 runs between the full load and 75% of the full load, since the displacement of the push rods 89, 87 by the accelerator 85 is small, the position of the needle valve 51 is controlled so that the springs 47, 53 and 73 and the pressures in the compressed air chamber 41 and the exhaust gas chamber 43 will be balanced. Then the EGR rate is determined according to the position of the needle valve 51.

In this embodiment, the pressure in the exhaust duct 19 changes, ranging from about 100 mmHg to 700 mmHg, and the pressure in the delivery duct 13 changes, ranging from about 100 mmHg to 760 mmHg, when air from the compressor 7 is not discharged through the branch duct 66. At the normal load of the engine 11, by discharging the air through the branch duct 66, the pressure difference between the exhaust duct 19 and the joining portion 22 of the delivery duct 13 is kept to about 100 mmHg in the normal operation.

Figure 5A:
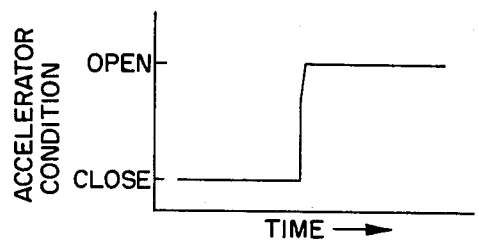
FIGS. 5a to 5c are graphs showing an accelerator operation condition, a relation of NOx produced to time and a relation of an exhaust gas recirculation rate to time in a conventional diesel engine with a turbocharger.
Figure 5B:
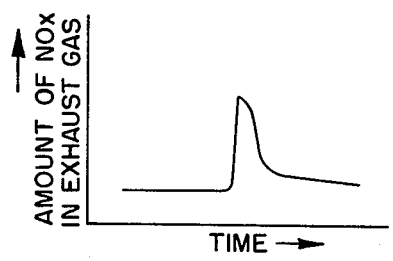
Figure 5C:
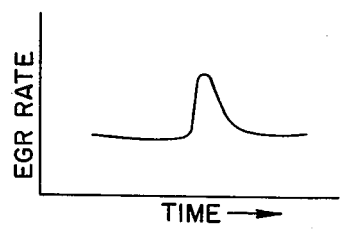

As described in the background of the invention, in a conventional diesel engine with a turbocharger, the NOx in the exhaust gas and EGR ratio when an accelerator is stepped on abruptly in its operation will be explained, referring to FIG. 5a to 5c. When the accelerator is stepped on to rapidly increase its opening degree as shown in FIG. 5a, NOx in the exhaust gas and EGR ratio increase rapidly for only a short time, and then they settle down as shown in FIG. 5b and FIG. 5c. However, for example on the paper for recording measurement of the NOx, a peaky rapid raising condition of NOx as shown in FIG. 5b is recorded. Factually, when the engine 11 is running, this phenomenon is recorded every time when the accelerator is stepped on so that the total amount of NOx may exceed the limitted value. Therefore this is not disregarded.

In the embodiment of the invention, the exhaust gas recirculation system is provided with the dashpot so that even if the accelerator is abruptly stepped to fully open, the EGR rate does not change abruptly.

Thus, in the embodiment of the diesel engine 11 with a turbocharger, the exhaust gas can be recirculated at a proper rate without passing through the compressor, and when the accelerator 85 is stepped on to the full extent, the engine 11 can run at the maximum output by making the exhaust gas recirculating zero. Therefore, the discharge of NOx that is a defect of the diesel engine 11 can be decreased without lowering the running performance.

Another embodiment of the invention will be described referring to FIG. 6.

Figure 6:
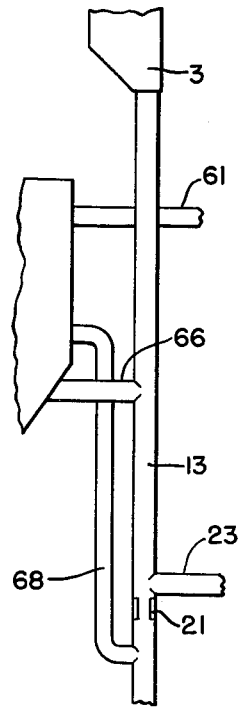
FIG. 6 is a partial diagram of another embodiment for an exhaust gas recirculation mechanism of an engine with a turbocharger according to the invention.

FIG. 6 is the same as FIG. 2 except that a distance between throttle 21 and the branch duct 66 is longer than in FIG. 2 and the recirculation duct 23 is connected to the delevery duct 13 immediately upstream of the throttle 21. By this construction the pressure immediately upstream of the throttle is lowered so that the exhaust gas recirculation may be effected.

What is claimed is:

1. An exhaust gas recirculation mechanism for an internal combustion engine with a turbocharger including a turbine driven by exhaust gas from the engine and a compressor operatively connected to the turbine to deliver compressed air to the engine, which mechanism comprising:

a delivery passage communicating between an intake port of the engine and the compressor;

an exhaust passage communicating between an exhaust port of the engine and the turbine;

a recirculation passage with one way valve means connected to both the exhaust passage and the delivery passage for passing part of the exhaust gas from the engine to the delivery passage only when a pressure difference between the exhaust passage and the delivery passage reaches a predetermined value;

means connected to the delivery passage upstream of the a recirculation passage joining portion for discharging part of compressed air in the delivery passage; and means responsive to both a pressure in the delivery passage and a pressure in the exhaust passage for controlling the part of the compressed air discharging through the discharging means so that a pressure of compressed air at the recirculation passage joining portion will be lowered; whereby part of exhaust gas from the engine can be recirculated to the engine through the exhaust passage, the recirculation passage and the delivery passage.

2. The exhaust gas recirculation mechanism according to claim 1, further including means being engaged with an accelerator when an output of the engine exceeds a predetermined load for restricting movement of the controlling means so that the quantity of the part of the compressed air discharging according to the movement of the accelerator will be controlled.

3. The exhaust gas recirculation mechanism according to claim 2 further including means for damping a rapid movement of the controlling means.

4. The exhaust gas recirculation mechanism according to claim 3, further including means for moving the damping means in the opposite direction to the movement of the controlling means made by the accelerator.

5. An exhaust gas recirculation mechanism for a diesel engine with a turbocharger including a turbine driven by exhaust gas from the engine and a compressor operatively connected to the turbine to deliver compressed air to the diesel engine, which mechanism comprising:

a delivery duct connected to the compressor and the engine for introducing compressed air from the compressor into the engine;

a throttle disposed in the delivery duct;

a exhaust duct connected to the turbine and the engine for introducing exhaust gas from the engine into the turbine;

a recirculation duct with a check valve connected to the exhaust duct with the delivery duct downstream of the throttle, the check valve allowing part of the exhaust gas in the exhaust duct to flow into the delivery duct when a pressure difference between in the exhaust duct and in the delivery duct exceeds a predetermined value;

a control valve including a casing, a partition secured to the casing and defining a valve box in cooperation of the casing, the valve box communicating with the delivery duct upstream of the throttle and being provided with a valve seat, a diaphragm secured to the casing and defining a first chamber and a second chamber, the first chamber communicating with the exhaust duct, the second chamber communicating with the delivery duct downstream of the throttle, a needle valve including a valve body portion facing the valve seat of the valve box and a stem portion of which one end is projected into the second chamber through the partition and secured to the diaphragm, a first spring disposed compressed between the partition and the diaphragm, a rod with a flange one end of which is disposed in the first chamber with its flange and the other end is disposed out of the first chamber, a spring disposed compressed between the flange of the rod and the diaphragm, and means responsive to an accelerator for pushing the rod when the accelerator is stepped on to a predetermined extent.

6. The exhaust gas recirculation mechanism according to claim 5, further including a dashpot means connected to a rod portion of the needle valve extending in opposite direction to the stem portion and means operatively engaged with the accelerator for moving the dashpot means in the opposite direction to the movement of the rod by made the accelerator when the accelerator is stepped on to a predetermined extent.

* * * * *